United States Patent Office 2,854,359
Patented Sept. 30, 1958

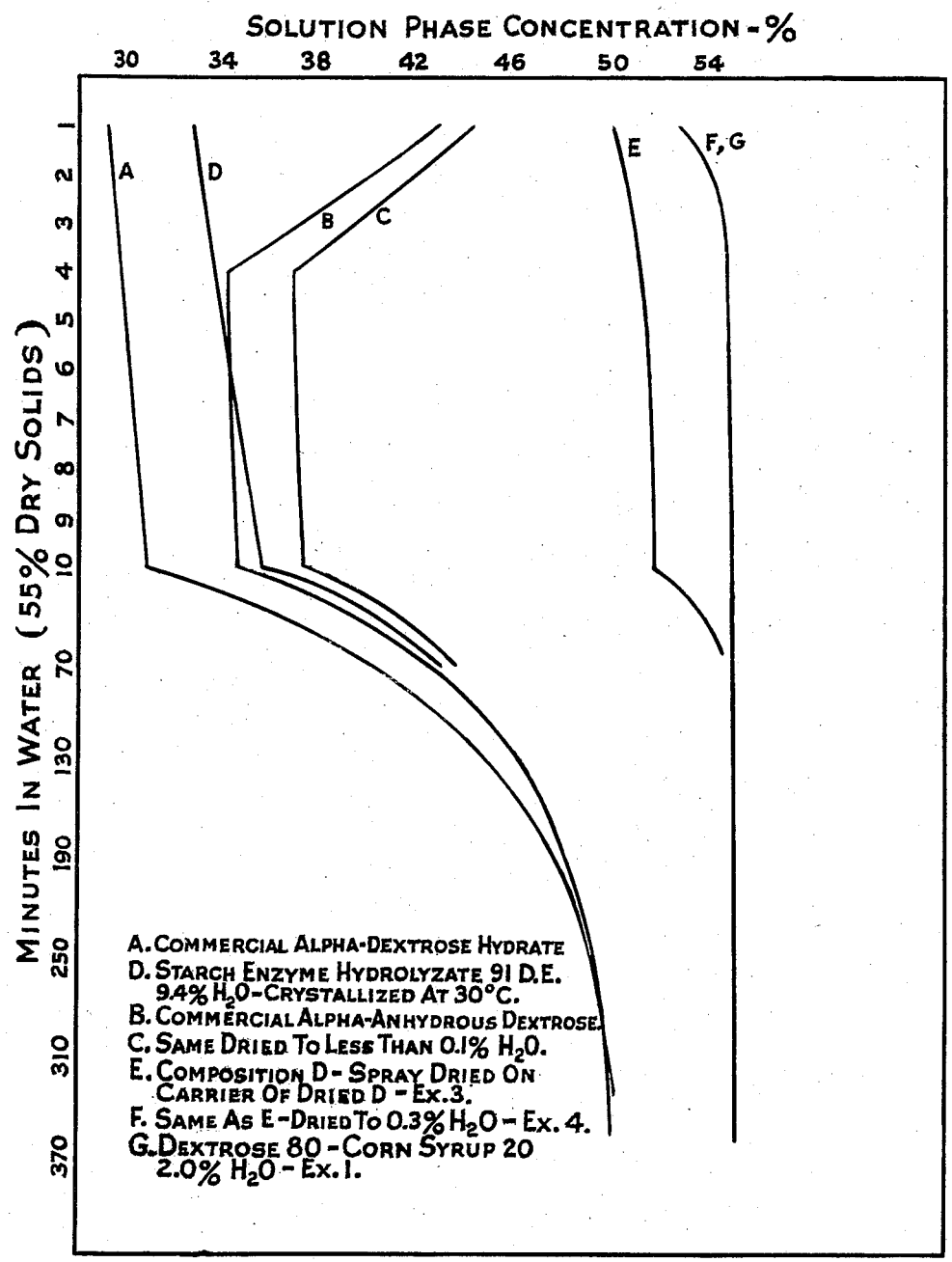

2,854,359

STABILIZED DEXTROSE COMPOSITION

Alexander L. Wilson, Palos Park, Ill., and Irwin Frankel, Towson, Md., assignors to Corn Products Refining Company, New York, N. Y., a corporation of New Jersey Application August 9, 1956, Serial No. 603,107

6 Claims. (Cl. 127—30)

This invention relates to a dextrose composition in a new and dry form which is highly and readily soluble in water, which is stable toward changes in solubility and which is economically and commercially attractive.

A shortcoming of the common dextrose of commerce, the alpha-hydrate, is its restricted solubility in cold water. The other commercially available but more expensive form, the alpha-anhydrous dextrose, has better initial solubility but reverts to the less soluble dextrose hydrate in process of solution. As a result, it is necessary to employ either heat or prolonged agitation in the preparation of dextrose solutions at concentrations of 40 to 50 percent. Such operations are disadvantageous in many cases and may be impractical, for example, in soft drink manufacture. In spite of other desirable characteristics, dextrose is thus denied use as an important sweetener by qualities which are variously described as low solubility, instability of solution or low rate of solution.

The solubility behavior of dextrose is fairly well established. Initial solubilities of the several known forms in water at 25° C. are about as follows:

| | Percent |
|---|---|
| Hydrate (alpha) | 30 |
| Anhydrous (alpha) | 45 |
| Beta (anhydrous) | 60 |
| Equilibrium mixture | 50 |

In pure form, all forms dissolve rapidly up to their solubility limit. Dextrose hydrate, however, when supplied in excess, only gradually exceeds a solubility of 30 percent and in time reaches the equilibrium solubility. Starting with anhydrous dextrose on the other hand, solution concentrations no sooner reach about 40 percent than massive crystallization of dextrose hydrate occurs and the amount of dissolved dextrose abruptly drops. Thereafter, the curve of solution concentration versus time merges with that of the initial dextrose hydrate.

The drawing includes solubility patterns of the two commercial alpha dextroses, curves A and B. Included also is curve C, which represents the maximum attainable improvement in solubility by rigorous drying of either A or B. The data for these curves were derived as follows. To 45 parts of water at an initial temperature of 25° C. was added 55 parts of the given total sugar, dry substance, at the same temperature. Contents of the uninsulated vessel were stirred at a standard and moderate rate and samples of solution phase were withdrawn at intervals for measurement of concentration by refractometer. Dextrose particle size was held constant.

Pure beta dextrose dissolves rapidly in water at 25° C. to a concentration of 60 percent but this solution in time reverts again to the equilibrium solubility. It is also clear that a dextrose composition corresponding to the equilibrium contents of 63 percent beta and 37 percent alpha will at once form the equilibrium solution. Since pure beta dextrose is rare and costly on the basis of any manufacturing procedures yet advanced, practical work in the field of rapidly dissolving dextroses has been directed toward compositions which would contain of the order of 50 to 60 percent of the beta form. Examples of such attempts include U. S. Patents 1,693,118; 2,324,113 and 2,669,530. None are known to have been successfully practiced.

Quite apart from the practicality of producing a dextrose of high beta content has been the totally unsolved problem of stability. Typical of this poor stability are the following data obtained on storage in sealed containers at 37° C. of a dextrose composition high in beta content:

| Percent Moisture | Initial Percent Beta | Days | Final Percent Beta |
|---|---|---|---|
| 0.88 | 47 | 10 | 7 |
| 0.70 | 47 | 11 | 16 |
| 0.32 | 53 | 30 | 33 |
| 0.32 | 53 | 90 | 10 |
| 0.21 | 53 | 30 | 45 |
| 0.21 | 53 | 90 | 33 |

Such compositions also tend to cake badly during storage in bags. If initial moisture can be reduced to a level appreciably below 0.2 percent where stability is satisfactory, a level which is expensive to reach and invariably promotes undesirable color, there still remains the problem of preventing moisture pick-up in storage.

Along another direction, it has been proposed to produce dextrose in a glassy or amorphous, rather than crystalline form. This is the form in which corn syrups of relatively low dextrose content can be spray dried with relative ease. These do not fulfill important dextrose demands and are intrinsically hygroscopic and difficult to handle. Dextrose itself can be converted to glassy form, but only by exceedingly delicate techniques of sheet or spray cooling from the fused state. The product as directly prepared is highly soluble, but it is soft, tacky, excessively hygroscopic and unstable. Thus it rapidly reverts to a crystalline dextrose of poor water solubility when at a moisture content of 1 percent or on exposure to relative humidities as low as 11 percent at 25° C.

From the foregoing it is apparent that there is lack of and need for a solid dextrose in new form which readily and permanently dissolves to a high concentration in water, which has good handling and storage properties, which has the necessary qualities of color, sweetness and taste and which can be produced economically. It is the main object of our invention to provide such a product.

We have discovered a new form of dextrose which is highly practical to manufacture and store, and which has highly acceptable properties in use. Physically, it is in the form of free-flowing, semi-crystalline, hard, non-caking particles. Chemically, it comprises in relatively homogeneous distribution about 85 to 95 percent dextrose and 15 to 5 percent soluble polysaccharides and contains not over 4 percent moisture. It is manufactured by drying a syrup of the components into particle form in a limited temperature region and under crystallizing conditions.

The soluble polysaccharides suitable for purposes of our invention include the non-dextrose portions of starch hydrolyzates formed in either acidic or enzymatic conversions. For example, hydrolyzates resulting from enzymatic conversions of starch and containing 5 to 90 percent of polysaccharides may be used as a source of polysaccharides for purposes of our invention. In fact, enzymatically converted starch hydrolyzates containing at least 85 percent and not more than 95 percent of dextrose (15 to 5 percent of polysaccharides) may be used as the complete source of both polysaccharides and dextrose. Hydrolyzates resulting from acid conversion of starch are particularly a good source of polysaccharides but the range of polysaccharide content therein is not as broad as for enzymatic hydrolyzates, the range being 65 to 95 percent. A preferred source of polysaccharide, and incidentally a partial source of dextrose, is the well known commercial corn syrup which can be mixed with dry dextrose or dextrose solutions of the proper concentrations. It is understood that both the polysaccharide and dextrose will have been previously refined in the normal manner to remove color and non-saccharide impurities.

The limits of dextrose content of the dextrose-polysaccharide composition are 85 to 95 percent. At higher dextrose contents, it is not possible to achieve rapid solubility characteristics and more especially retention of such characteristics during aging and exposure to humidity. At lower dextrose contents, it is not possible to achieve hard particles that are free-flowing and resistant to caking as against aging, humidity or pressure.

Depending somewhat on composition, method of preparation and storage conditions, the total moisture content of our product should lie in the range of 0.5 to 4 percent. At the maximum polysaccharide content, with drying conditions designed for relatively high crystallinity and for storage conditions not extreme in temperature, as high as 4 percent moisture is satisfactory. At the minimum polysaccharide content and for extreme storage stability, it may be necessary to approach the lower moisture limit.

Various drying and forming techniques that lead to solid particle growth during drying are applicable to our product. Thus we may spray dry from a heavily nucleated mass of the initial syrup. We may flash dry the syrup-wetted mass of preformed product. We may spray the syrup onto a pneumatic suspension of preformed product held under drying conditions. We prefer to dry by continuous spraying of syrup onto a tumbling bed of preformed product moving through a rotating kiln in concurrent or countercurrent flow with a stream of hot air.

The fundamental requirements of drying are several: (1) a concentrated, homogeneous, aqueous syrup phase of the specific dextrose-polysaccharide composition held and equilibrated at a temperature above about 50° C.; (2) a particulate, solid phase of preformed or self-induced product at a temperature in excess of 50° C. and in motion; (3) means for mingling the syrup and solid phase at a temperature not below 50° C. nor above 80° C. in the combined mass; (4) means for drying the commingled particles in motion and within a temperature range of about 50° C. to the softening temperature of the particle; and (5) means for prompt cooling of the product to a temperature not above 35° C.

Our new product is highly acceptable in color and palatability. It closely approaches dextrose in sweetness and may surpass the commercial product in blandness of flavor. The flowability and storability are excellent. The property of high and rapid solubility is outstanding.

The dissolving characteristics of our product are comprehensible in terms of the dextrose structure. By analysis we find that 40 to 60 percent of the dextrose is in the beta form. We cannot measure dextrose hydrate quantitatively, but from dissolving effects noted on product with added dextrose hydrate, our preferred product appears essentially free of this form of dextrose. Its high solubility is then due, in one aspect, to high beta content, or in another aspect, to an approach to alpha-beta equilibrium. High rate and completeness of solution is then due to the vanishingly low crystalline hydrate content. There may be a small gain due to inhibition of dextrose hydrate formation in the concentrated dextrose system undergoing solution.

The cause of the high beta content and low hydrate content are somewhat less comprehensible. The temperature region of 50° C. and above used in the drying cycle is not one in which beta dextrose is ordinarily thought to crystallize but is one that ordinarily favors anhydrous alpha crystallization. However, in this region the equilibrium melt should consist of about 63 percent beta and 37 percent alpha dextrose and in no case should dextrose hydrate be stable. It seems reasonable that the syrupy polysaccharides of our composition, while permitting a certain degree of crystallization of dextrose during the drying, perhaps largely to the alpha anhydrous form, severely limit it to an extent which does not seriously alter the beta-alpha ratio. In general we may say that the high beta, zero hydrate content of the original hot syrup is frozen into the product during drying and during the short period of cooling.

In a way, we may say that the same dextrose composition remains permanently frozen in under the normal conditions of storage. This stabilization action must be such as to prevent the normal reactions in such a system. These include loss of beta dextrose by conversion to alpha, gain of dextrose hydrate by reaction with moisture, and caking which is a probable function of crystal growth and solid flow induced by pressure, temperature and humidity variations within the package. We conceive this normal group of effects to proceed as follows:

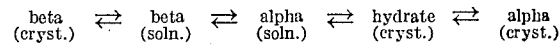

These are all water induced reactions and are ordinarily sensitive to very small contents of moisture. Complete and rapid transformation of beta to alpha dextrose is explainable in this scheme even at low moisture levels in a pure dextrose system. We explain the stability of our product at much higher moisture levels by a surprising ability of the polysaccharide component to immobilize water either by absorption or by barrier films set up within the particles. A specific function may be to maintain an effective vapor pressure of water below that required for dextrose hydrate formation. The latter effect will also explain the noted improvement during aging of products of our invention which initially may have a borderline content of hydrated dextrose.

In practice it is possible to obtain either by accident or by design a product which meets all desired and specified criteria except in respect to absolute completeness of rapid solution. That is, solution at 50 percent solids or higher may be rapidly complete to the limit of accuracy of analytical measurements but a visual haze may persist for some period of time. This effect is a manifestation of positive dextrose hydrate content. Dextrose hydrate may get into the product carelessly as by contact with fluid water during handling, accidentally as by contact with steam or wet surfaces during cooling, conveying, screening or recycling during production or by incomplete drying to the prescribed moisture levels or by carrying out the drying below 50° C. Such defects may be remedied by retreatment, with or without a net drying action depending upon the overall moisture content, for short times in the temperature region of 50° C. and above. In practice it is not necessary that all of the drying be accomplished in one step nor at a temperature of 50° C. or above. For example, part of the drying may be effected below 50° C., but in order to obtain the desired product, it is then necessary to hold the product at a temperature of 50° C. or above to adjust the moisture content, if necessary, and to cause the moisture present in the form of the hydrate to migrate to the polysaccharide component. It may even be advantageous in practice to submit the original syrup to an incomplete drying step for the purpose of forming particles and follow this with a finishing step above 50° C. to accent desired properties.

It is clear that the region of about 35° C. to about 50° C. during production is one which results in the product properties deteriorating and consequently one that should be avoided. With respect to upper limit of temperature, the useful region above 50° C. is terminated partly by temperatures that result in rapid discoloration of the saccharide composition but more definitely by temperatures that result in flow, stickiness and hence loss of particle identity. For particles at the moment of wetting with original syrup, this upper temperature is about 80° C. For particles dried to final moisture, the upper limit is about 100° C. Thus in drying in concurrent flow with air, particle temperatures will drop within the region of 80° C. to 50° C. In drying with countercurrent flow of air, particle temperatures may rise within the region of 50° C. to 100° C.

Returning to the drawing, it is seen that there are two types of dextrose in respect to dissolving characteristics. The first is a slow dissolving type which, depending upon agitation and heat input, may require 5 to 10 hours for attainment of a complete and stable solution at 50 percent solids at 25° C. The second, a fast dissolving type, we shall define as one that approaches complete and stable solution at dextrose to dextrose plus water concentrations of 50 percent in 5 to 10 minutes from a starting temperature of 25° C. Curves A, B and C are of slow dissolving dextroses. Curve D is clearly of the same type. This curve represents a sample of enzymatic hydrolyzate of starch of 90 percent dextrose content, as in Example III, which had been slab crystallized at 9.4 percent moisture and under room temperature. Evidently, polysaccharide content within our disclosed range, of itself, is no criterion of rapid solubility. Furthermore, the same product when dried to 3.7 percent moisture, even at the favorable temperature of 65° C., reached a solution concentration corresponding to only 40 percent dextrose in 20 minutes. Only by a course of treatment which includes a step of drying from a heated equilibrated syrup, or an equivalent step of fusion, is high solubility attained. Curves E, F, and G referred to hereinafter will illustrate this.

The following examples which are typical and informative only will further illustrate the invention.

Example I

Crystalline dextrose hydrate was remelted with water and blended with corn syrup of 42 D. E. in the proportion of 80 parts of dextrose and 20 parts of syrup solids. The resulting composition analyzed, dry basis, 87 percent dextrose and 13 percent polysaccharide and had a dextrose equivalent of 91 percent. The solution was carbon refined, filtered and evaporated to a gravity of 38–39° Bé. This product at a temperature of 166 to 168° F. was fed in liquid form to the described drying operation.

The drier composed a rotary, internally baffled drum, inclined from the horizontal, and approximately 6 ft. in diameter and 30 ft. in length. It was supplied with a screw for feeding dry material, with nozzles for spraying wet feed and with hot air in concurrent flow with product. The nozzles were situated 2.5 ft. from the level of the dry bed. In operation the drier was slowly rotated so that its content of solid particles was constantly cascaded and kept in free-flowing condition and in intimate contact with hot air of proper temperature and humidity relation to provide drying during the flow of each stream through the drum. Near the inlet end the nozzles continuously supplied the liquid feed to the flowing solid particles at a rate determined by the combined needs of free particle flow and moisture removing capacity of the system.

The drier was succeeded by a cooling drum of approximately the same size and fed with a countercurrent flow of low humidity cooling air. Product from the cooler was screened through a 20 mesh vibrating screen. Part of the material through the screen became finished product. Another part, together with ground coarse material and all fines from the dust collectors on the air streams was returned as feed to the drier.

In start-up, the whole system was charged to operating capacity with 7000 lbs. alpha anhydrous dextrose in fine, crystalline particle form. Spraying of liquid feed was started and maintained at approximately the rate of 700 lbs. per hour. Output from the drier was approximately 6500 lbs. per hour; calculated holding time in the drier was approximately 30 minutes. Air temperature to the drier was 180 to 200° F. and from the drier, 105 to 112° F. Temperature of product during its period in the drier dropped from 175° F. to 105° F.; however, the major portion of the drying was effected above 125° F. Air to the cooler was 38 to 40 F., air from the cooler, 97 to 100° F. The total run lasted 61 hours of which 25 hours was required to eliminate the effects of initial pure dextrose seed bed.

Thereafter, product of the following properties was uniformly obtained:

| | | |
|---|---|---|
| Dextrose content, D. B | 85.9–87.6% | 87% avg. |
| D. E | 89.8–91.1% | 91% avg. |
| Beta dextrose/dextrose | 50 –55% | 53% avg. |
| Moisture | 1.7– 2.7% | 1.9% avg. |
| Color (20° Brix) | 3.2– 4.0% | <4 avg. |
| 20–80 mesh | | >90%. |
| lb. per cu. ft. packed volume | | 52. |

Rate of solution of product was determined in tests involving 50 g. D. B. solid to 50 g. total water at 25° C. Analytical values for the dissolved phase corresponded to 99.9 percent in solution in 3 minutes. See also Figure 1, curve G. Haze in a proportion below analytical measurement remained in some cases for 30 to 60 minutes. A corresponding test with sucrose showed 99.9 percent dissolved in 3 minutes with slight residual haze in 5 minutes.

When dry corn syrup solids were mechanically mixed with either anhydrous dextrose or dextrose hydrate, there was little change in solution rate of the dextrose component. Thus in water in a proportion of 60 parts to 40 parts of anhydrous dextrose content, only 97 percent solution of the mixture was reached in 60 minutes. Pure anhydrous dextrose dissolved to the extent of 96 percent under the same conditions.

Example II

Samples of product of Example I were placed in sealed containers and submitted to heat treatment for short periods at several temperatures with the following results:

| Temp., °C. | Time, Hr. | Moisture, Percent | Beta-Dextrose / Total Dextrose | Solubility at 25° C. |
|---|---|---|---|---|
| 25 | 0 | 2.56 | .51 | Clears at 40 min. |
| 40 | 96 | 2.47 | .46 | Clears at 87 min. |
| 63 | 16 | 2.42 | .44 | Clears at 5 min. |
| 80 | 1 | 2.50 | .48 | Do. |
| 80 | 3 | 2.35 | .46 | Do. |
| 100 | 0.5 | 2.25 | .50 | Do. |
| 100 | 1 | 2.23 | .52 | Do. |

Thus with negligible change in moisture and in beta dextrose content, the product reached rapid and optically complete solubility at 50 percent solids after short treatments in the temperature range of 60 to 100° C. We attribute the effect as due to loss of crystalline dextrose hydrate by re-equilibration of moisture within the mass. Treatment at 40° C. pointed to an opposite effect, increase in dextrose hydrate, and the product at given moisture content is presumably unstable at this temperature. Stability, however, was positive at temperatures up to 30° C.

Example III

Starch was hydrolyzed in conventional manner to a D. E. value of 17 percent, filtered, and the liquor further converted with *Aspergillus niger* enzyme to a D. E. of 91 percent and a dextrose level of 87 percent. The liquor was ion exchanged, concentrated to 45° Bé. and allowed to crystallize at room temperature for several weeks to a hard solid. The slab was ground and dried, and 45 lbs. was introduced as seed bed in a rotary drier.

This drier of dimensions 1 x 8 ft. was internally baffled to cascade its contents during operation. It was provided with a flow of hot air moving concurrently with solid, and with a pneumatic nozzle to spray liquor onto the moving bed. This liquor consisted of the same refined enzymatic hydrolyzate as the bed, being supplied to the nozzle at 40° Bé. and 160° F. The ratio of liquor to solid bed was 16:1 on a solids basis. Inlet air temperature was 165° F., outlet air, 110° F. Temperature of product during drying was in the range of 160 to 110° F. During operation, over-flowing product was screened through 20 mesh and recycled. Operation was continued until accumulated product amounted to about 130 lbs. or a 75 percent replacement of original seed.

Product analyzed 91 D. E., 87 percent dextrose, d. b., and 3.7 percent water. Color at 20° Brix was 2.7; beta dextrose comprised 40 percent of the dextrose. When solubility was tested at 50 percent concentration in water at 25° C., 95 percent dissolved in 3 minutes, 96 percent in 7 minutes and 97 percent in 15 minutes. The initial slab hydrolyzate, primarily dextrose hydrate in a syrup medium under the same conditions of testing was 67, 69 and 72 percent soluble at the same intervals of time. Figure 1, curve E, shows the rapid and sustained solubilities of the product at concentrations above 50 percent and its classification as a quick dissolving type in spite of considerable unreplaced starting seed.

*Example IV*

Product of Example III was dried further under various conditions. Dried to 0.3 percent moisture during 16 hours at 76° C., it gave complete solution in water at 55.5 percent solids in 10 minutes. Drying to 0.7 percent moisture, stirring 4 hours at 100° C., gave equally good results. See Figure 1, curve F, for comparison of solubility characteristics of the product with previously known products.

*Example V*

Product of Example III was stored for 120 days at 25° C. while exposed to either 30 percent or 50 percent humidity. There was no change in beta dextrose content, and a loss of 0.13 and a gain of 0.83 percent moisture, respectively. Product of Example IV under the same conditions rose to 1.37 and 2.08 percent moisture levels in 30 days, again with no loss of beta dextrose content. Pure dextrose of 40 percent beta content and at 0.3 percent moisture, lost 0.1 percent moisture in 24 days at 50 percent relative humidity but dropped to 9 percent in beta content.

Products of Examples III and IV showed good physical stability during storage. Caking tendency did not exceed that of dextrose hydrate which is considered commercially satisfactory. During accelerated storage tests in commercial bags at 90° F. and 85 percent relative humidity, there was no loss in beta content, and equal or improved solubility rates except under excessive moisture pick-up.

*Example VI*

Crystalline dextrose hydrate and 42 D. E. corn syrup, both in refined state, were blended in a proportion of 5:1 and brought to 40° Bé at 150° F. This liquor at 40° Bé was sprayed onto a starting bed of alpha anhydrous dextrose in the equipment of Example III. Inlet air was supplied at 180° F.; inlet air temperatures of 190° F. and 240° F. proved too high. Operation was run in cycles, consisting of spraying 25 lbs. liquor onto 50 lbs. seed bed, drying to 1 to 2 percent moisture, screening and returning 50 lbs. product to the drier. The operation was continued to 90 percent displacement of original seed.

The final product analyzed 90 D. E., 86 percent dextrose, 41 percent beta dextrose and 1.5 percent moisture. In a solubility test at 50 percent solids at 25° C., 100 percent of this product dissolved in 7 minutes. The original anhydrous dextrose in the same test was only 67 percent dissolved at the same time and still only 83 percent dissolved in 80 minutes.

*Example VII*

A small rotary, baffled drum arranged for internal heating by direct hot air was charged with 193 g. D. B. of product of Example I. Outlet air temperature was brought to 75° C. At the same time, clear syrup prepared at 80 percent concentration from the same dextrose-polysaccharide composition as of the charged solid was heated to 75° C. Under air flow and during cascading of the solid, 54 g. D. B. of the syrup was sprayed into the drum during 80 minutes. The total mixture was dried thereafter for 2 hours.

During the run, drum speed was 18 R. P. M. Inlet air temperature averaged 85° C., outlet air 75° C. Bed temperature was between 70 and 75° C.

Product was removed from the drum, cooled and ground. It amounted to 240 g. D. B. and represented almost complete mechanical recovery. It was free flowing and light colored. Moisture was 0.61 percent. Ratio of beta to total dextrose was 54 percent. In the standard solution test, a clear 51 percent solution was attained in in 5 minutes. The product on storage with access of moisture reached a water content of 1.6 percent without change in physical or chemical properties.

We claim:

1. As a new composition of matter a hard, semi-crystalline dextrose product in dry, homogeneous free-flowing form, stable against loss of beta content, consisting essentially of about 85 to 95 percent of dextrose, dry basis, and about 15 percent to 5 percent of soluble polysaccharides, dry basis, derived from a starch hydrolyzate; said dextrose product containing not more than about 4 percent of moisture and being substantially free of alpha dextrose hydrate and dissolving in water at 25° C. to the extent of 50 percent concentration without separation of alpha hydrate crystals; said starch hydrolyzate being from the group consisting of an enzymatically converted starch containing 5 to 95 percent of polysaccharides and an acid converted starch containing 60 to 95 percent of polysaccharides, and mixtures thereof.

2. A process for preparing a novel dextrose product which comprises heating and drying to a hard, semi-crystalline, free-flowing form containing not more than about 4 percent of moisture, a solution consisting of about 85 to 95 percent of dextrose, dry basis, and about 15 to 5 percent of soluble polysaccharides, dry basis, onto a preformed dextrose product; said solution having been equilibrated at a temperature above 50° C.; the final temperature of said heating and drying step not falling below about 50° C. nor rising above the softening point of the dried product; said polysaccharides being derived from a starch hydrolyzate from the group consisting of an enzymatically converted starch containing 5 to 95 percent of polysaccharides and an acid converted starch containing 60 to 95 percent of polysaccharides, and mixtures thereof.

3. A process according to claim 2 wherein said solution is an enzyme hydrolyzate of starch containing 85 to 95 percent of dextrose, dry basis.

4. A process according to claim 2 wherein the hydrolyzate is a corn syrup.

5. Process according to claim 2 wherein the drying is carried out by continuous spraying of the solution onto a bed of the preformed dextrose product.

6. A process for preparing a novel dextrose product which comprises drying a solution consisting of about 85 percent to about 95 percent of dextrose, dry basis, and about 15 to 5 percent of soluble polysaccharides, dry basis, onto a preformed dextrose product, to a hard, semi-crystalline free-flowing form wherein the temperature during drying may be below 50° C. and thereafter heating the resultant product at a temperature within the range of about 50° C., and the softening point of the dried product; the moisture content of the final product being not more than about 4 percent; said solution having been equilibrated at a temperature above 50° C.; said polysaccharides being derived from a starch hydrolyzate from the group consisting of an enzymatically converted starch containing 5 to 95 percent of polysaccharides and an acid converted starch containing 60 to 95 percent of polysaccharides, and mixtures thereof.

References Cited in the file of this patent

UNITED STATES PATENTS

| | | |
|---|---|---|
| 1,471,347 | Newkirk | Oct. 23, 1923 |
| 1,521,830 | Newkirk | Jan. 6, 1925 |
| 1,693,118 | Newkirk | Nov. 27, 1928 |
| 1,750,938 | Newkirk | Mar. 18, 1930 |
| 1,750,939 | Newkirk | Mar. 18, 1930 |
| 1,890,913 | Newkirk | Dec. 13, 1932 |
| 2,152,874 | Copland | Apr. 4, 1939 |
| 2,231,835 | Walsh et al. | Feb. 11, 1941 |
| 2,324,113 | Schopmeyer et al. | July 13, 1943 |
| 2,369,231 | Harding | Feb. 13, 1945 |
| 2,669,530 | Kite | Feb. 16, 1954 |